United States Patent [19]
Tichenor et al.

[11] Patent Number: 5,243,405
[45] Date of Patent: Sep. 7, 1993

[54] OPTICAL SYSTEM FOR SURFACE VERIFICATION

[76] Inventors: Clyde L. Tichenor, 15524 Cohasset St., Van Nuys, Calif. 91406; Irwin Ginsburgh, 24125 Clearbank La., Newhall, Calif. 91321

[21] Appl. No.: 638,574

[22] Filed: Jan. 7, 1991

[51] Int. Cl.$^5$ ............................................. G01B 11/30
[52] U.S. Cl. ................................. 356/371; 356/376
[58] Field of Search .......................... 356/371, 376

[56] References Cited

U.S. PATENT DOCUMENTS

| | | | |
|---|---|---|---|
| 3,866,038 | 2/1975 | Korth | 356/371 |
| 4,735,508 | 4/1988 | Bellio | 356/371 |
| 4,929,846 | 5/1990 | Mansour | 356/371 |
| 5,078,496 | 1/1992 | Parker et al. | 356/371 |
| 5,125,741 | 6/1992 | Okada et al. | 356/371 |
| 5,125,746 | 6/1992 | Lipshitz | 356/371 |

*Primary Examiner*—Frank Gonzalez
*Attorney, Agent, or Firm*—Albert O. Cota

[57] ABSTRACT

An optical system (10) that images a section of a textured surface and through non-symetrical optics creates a unique integrated image of its topology which allows specific identifications to be recorded and compared at a later date. A recording device (60) is mounted at the rear of a cylinder spread lens assembly (26) which in turn attaches to a lens support tube (28) that is clamped by a lens support assembly (50) that traverses along a vee-track (52). A spherical achromatic lens (24) images an illuminated surface (30) of the textured surface upon a cylinder spread lens (26b) which then presents a image to the detector/recording surface (34). The system (10) is initially located normal to the illuminated surface (30) at an acute illumination angle $\phi_1$ for coarse positioning. An illuminated image line (32) for the acute angle $\phi_1$ is supplied by a lamp (14) via a light mask (16) and a cylinder lens (22). After the textured surface is positioned, the system is moved to a position along the vee-track at an acute angle of reflection $\phi_2$ for precise surface identification and recording.

14 Claims, 4 Drawing Sheets

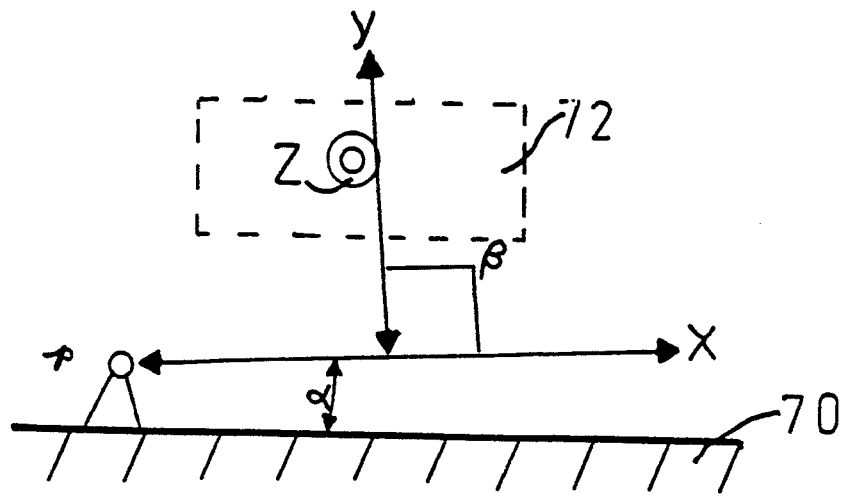
FIG. 7
FIG. 8
FIG. 9
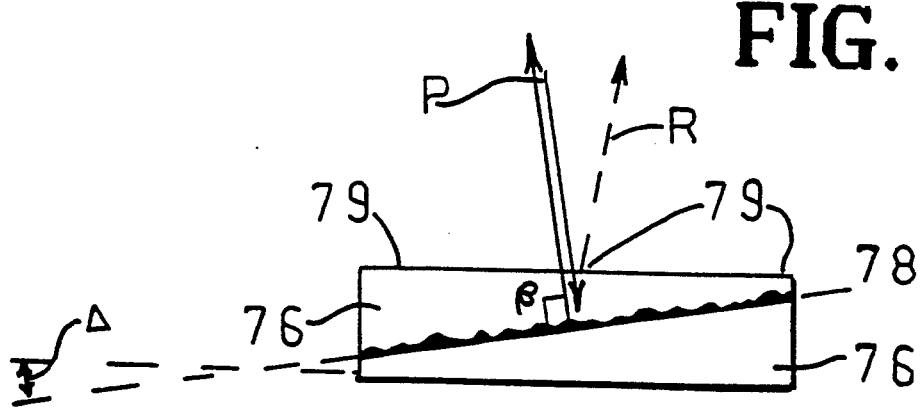
FIG. 10

OPTICAL SYSTEM FOR SURFACE VERIFICATION

TECHNICAL FIELD

The invention pertains to the general field of surface verification systems and more particularly to such a system that optically images a discrete linear surface section and by asymmetrical optics creates an integrated image based upon the unique surface topology, reflectivity, and color of the surface.

BACKGROUND ART

One of the prevalent problems existing in the world of artistic works, and especially in fine arts, is the separation and identification of original artistic works from counterfeit copies. Various experts examine such artistic work and judge it original, or not; and occasionally extensive scientific tests must be performed to establish their authenticity. Insurance companies and buyers are constantly at the mercy of art experts with regards to identifying valuable paintings and other works of art.

Each time an artistic work is bought, sold or insured, the question arises: is this an original or a copy? There is currently no simple, reliable and cost-effective method available to art connoisseurs and insurers for verifying the authenticity of a questionable work of art. There are estimates available that over 40 percent of artwork sold today are copies of originals.

Well executed copies of original works of art incorporate color, brush strokes, technique and pigment duplication as well as artificial aging where necessary. However, the microscopic details of the brush strokes cannot be duplicated exactly. The simple photography of original paintings does not supply sufficient information to detect these forgeries. Even magnified portions of an artwork surface texture are a two-dimensional record and can be duplicated by a skillful forger.

A painting's surface is actually a three-dimensional relief record. A magnified optical picture is a two-dimensional record of a three dimensional surface, and therefore, is difficult to use for comparison purposes. A precision optical system that focuses on the outermost surface of the brush strokes can record information that can be easily compared at a later date. In security uses, holograms have been used to prevent forgeries. Holograms are delicate and in credit card use can become flattened and indistinct from abuse within a wallet.

A search of the prior art did not disclose any patents that read directly on the claims of the instant invention. However, the following U.S. Patents were considered related:

| U.S. Pat. No. | INVENTOR | ISSUED |
| --- | --- | --- |
| 4,837,840 | Goldman | 6 June 1989 |
| 4,544,266 | Antes | 1 October 1985 |
| 4,468,807 | Moulton | 28 August 1984 |
| 4,455,083 | Elmes | 19 June 1984 |

The Goldman patent discloses a system for verifying the authenticity of various articles. The system develops a representation that characterizes an article for identification by comparison with a reference standard. For example, two beams of light are reflected from a specific area location on the article under investigation. The wavefronts of the beam are directed so as to interfere with each other and as a consequence an interference pattern or interferogram is produced. The interferogram is then sensed and compared to identify or authenticate the article under investigation.

The Antes patent discloses an apparatus for testing the authenticity of documents. The apparatus includes a machine-readable authenticity feature in the form of an optical microstructure for diffracting at least one component of a beam of light rays that impinges on the microstructure along a predetermined direction. The light rays diffracted define an effective center line of "gravity" along one direction. The diffracted beam is then sensed by a device that produces an electrical signal that is evaluated by another device where a YES or NO decision signal is produced that determines of the document is authentic or not.

The Moulton patent discloses a method for analyzing stored image details used for identification purposes. The method derives slopes from an image under investigation to provide three-dimensional recognition information. Data representing light levels of an image are stored in a picture memory device, which is then analyzed to select absolute illumination magnitudes between fixed locations of the image. The stored data is utilized to verify with current data and, depending upon the degree of correlation therebetween, an indication of recognition is either verified or rejected.

The Elmes patent discloses an apparatus for verifying that the fingerprint of a card bearer is identical to the fingerprint imprinted on the card. A match is verified by observing a predetermined minimum level of reflection of light from the imprinted negative fingerprint on the card and the fingerprint of the bearer. If the light levels are within a preset minimum standard, the fingerprint of the card bearer is deemed to be the same as the fingerprint on the card.

DISCLOSURE OF THE INVENTION

The brush strokes of oil and acrylic paintings as well as many sculptures include color, reflectivity, and texture as features of their physical surfaces. The present invention utilizes these inherent characteristics to illuminate and record in the form of a bar code the unique color, reflection, and surface details in a manner convenient to both recording and subsequent comparison.

The combined reflections at the chosen angle of incidence, which in turn depends on the surface texture and color reflectivity (textivity), create a definitive image which may be recorded and subsequently compared with the corresponding image from any artwork requiring confirmation as the one originally tested and recorded.

The ability to test a work of art and accurately record the exact patterns created by the inventive optical system makes it impossible to forge an artwork which would replace the original. By using multiple recorded textivity samples of the surface at selected secret orientations and locations, the permutations of creating an exact forgery are comparable to duplicating the fingerprints on a human being.

The optical system incorporates a two-dimensional moving structure that positions the optical system at various selected and exact locations on the artwork. The two-dimensional moving structure incorporates accurate indexing means so that all chosen locations may be recorded and subsequently accurately relocated during retest. For restoration purposes of very valuable artwork, the entire surface can be scanned and the images recorded.

While white light and magnified color image recordings are also desirable, tests conducted have shown that the use of laser illumination also creates stark, high contrast images that allow easy comparison. While most laser illumination is monochromatic, its reflected intensity is still a function of color, dispersion, and reflectivity. Several lasers, with different colors, can be used simultaneously or a krypton type "white light" laser, can be used to accommodate all colors.

The preferred illumination is directed at an acute angle to efficiently emphasize the outermost surface texture and its dispersion and reflection characteristics. By magnifying one dimension in a ten-to-one relation to the other orthogonal dimension, a linear image composite is created which is similar to the common bar-code or DNA fingerprint. This greatly facilitates subsequent comparison tests. For this reason, a line of illumination is preferred. A dispersed laser beam, by means of single axis optical dispersion, or by mechanical sweeping may also create the required linear illumination. Where texture is minimal, color can be emphasized by using white light illumination as previously discussed.

The present invention makes it possible for an artwork owner or insurer to be assured that any artwork once surface recorded by the inventive optical system for surface verification, can be easily identified when retested by a duplicate system. As these test records accumulate, less and less ambiguity of significant and tested artwork can exist. The system does not touch or affect the surface of the artwork in any way. Furthermore, the test procedure is simple, requires only an hour or so, and is relatively inexpensive.

Other features and advantages of the present invention will become apparent from the subsequent detailed description of the preferred embodiment and the claims taken in conjunction with the accompanying drawings.

BRIEF DESCRIPTION OF THE DRAWINGS

FIG. 7 is a schematic view of of an X, Y and Z positioning system having a coding alignment angle related to a surface tested.

FIG. 8 is a sectional view of an optical sandwich that provides a coded security device according to the present invention.

FIG. 9 is a perspective view of the optical sandwich shown in FIG. 8.

FIG. 10 is a planar view of an optical sandwich, rotated 90° to FIGS. 8 and 9, showing an angular bias of the opaque layer.

BEST MODE FOR CARRYING OUT THE INVENTION

Figure 1:
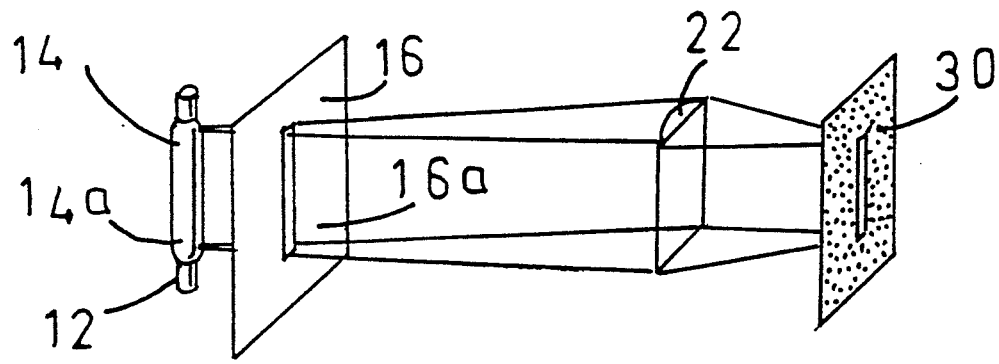
FIG. 1 is an isometric view of a typical filament type illumination system shown with an illuminated surface.
Figure 2:
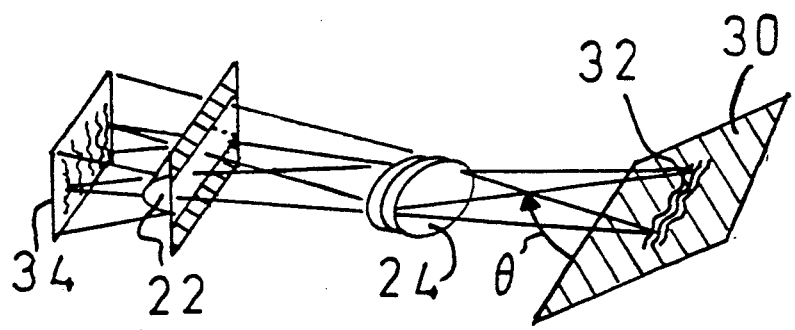
FIG. 2 is an isometric view of a typical assymetrical lens system from the illuminated surface projected onto a detector/recording surface.
Figure 3:
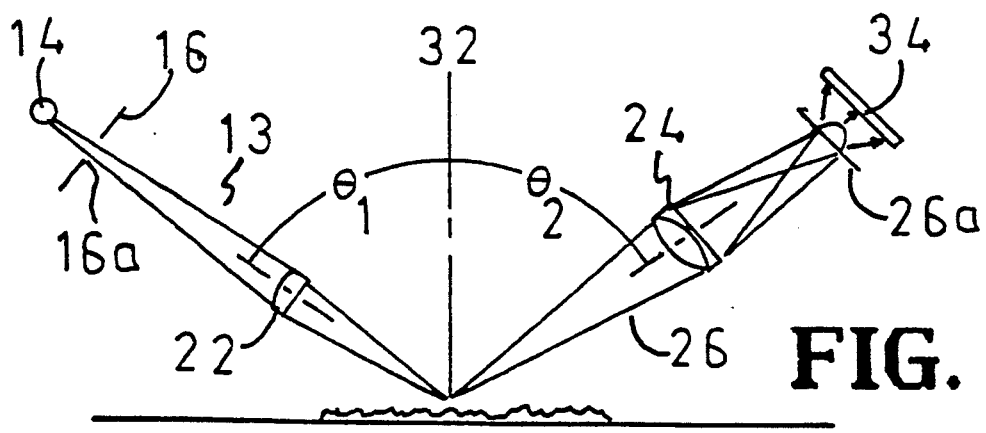
FIG. 3 is a plan view of the systems shown in FIGS. 1 and 2 used in combination at a typical angle of incidence.

Before the preferred embodiment is described, reference is made to FIGS. 1, 2 and 3 which illustrate the basic illumination and optical recording principles applicable to the present invention.

In FIG. 1, a system 10 is illustrated that employs an illumination source 12 that consists of a filament type lamp 14 having a linear filament 14a. The lamp 14 produces a linear light beam that is projected through a light mask 16 having an image opening 16a and is then imaged by a cylinder lens 22 which duplicates and projects the illuminated line of light image 16a onto the surface 30. In FIG. 2, the system is enhanced by having an illuminated line of light 32 projected through a spherical achromatic lens 24 and unequally imaged by the cylinder lens 22. The image from the lens 22 is then projected onto a detector/recording surface 34 where the image is recorded and preserved.

In FIG. 3, the elements shown in FIGS. 1 and 2, are combined to illustrate two optical paths that are separated by angle of incidence $\phi_1$ and angle of reflection $\phi_2$ where both angles are measured from the normal to the surface. As shown, the illumination from the filament type lamp 14, a light mask 16, and a cylinder lens 22 is incident at the angle $\phi_1$ onto the illuminated surface 30. The angle $\phi_1$ is measured between the center of the optical image beam from the cylinder lens 22 to an illuminated image line 32 and the normal to the illuminated surface 30. From the surface 30 the image is further projected at the reflected angle $\phi_2$ that is measured from the normal to the surface.

The best mode for carrying out the invention is shown in FIGS. 4 through 10, and is comprised of the following major elements: a stationary optical assembly 13 consisting of a filament type lamp 14, a light mask 16, a first mirror 18, a second mirror 20 and a cylinder lens 22; a movable optical assembly 23 consisting of a spherical achromatic lens 24, a cylinder spread lens assembly 26 and a lens support tube 28; a microscope objective lens 36, a lens tube support assembly 50, an image recording device 60 and a system housing 62.

Figure 4:
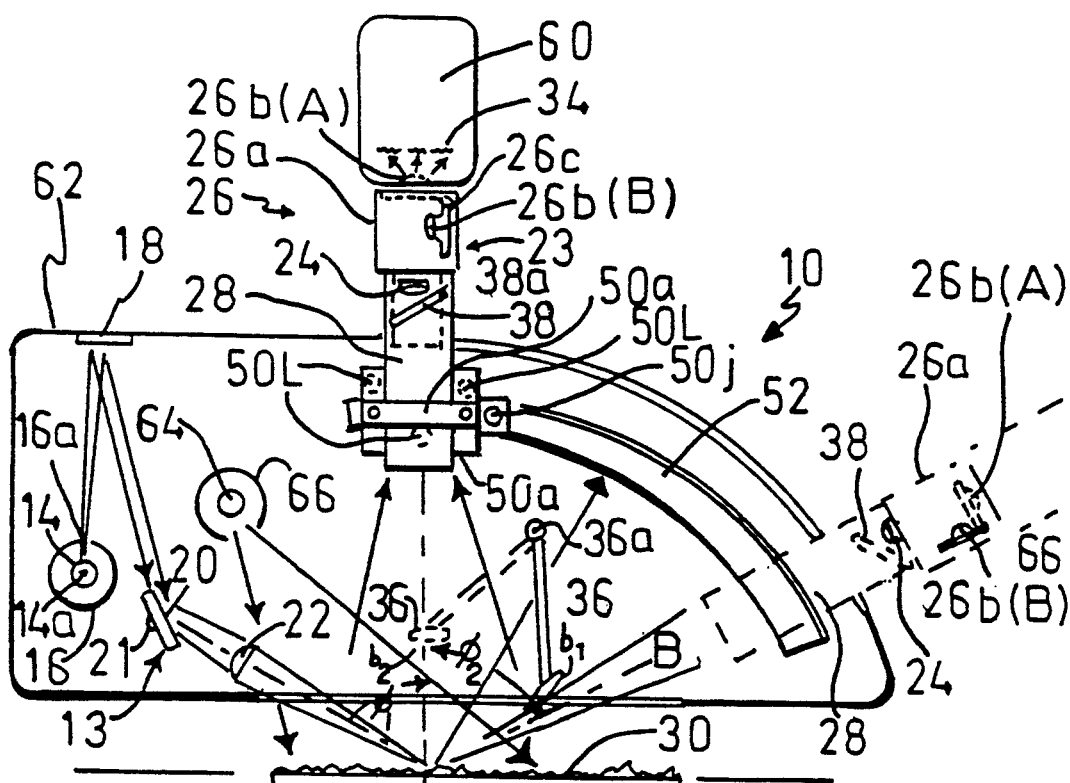
FIG. 4 is a plan view of the complete optical system for surface verification.

As shown in FIG. 4, the lamp 14 provides a linear illumination through the image opening 16a in the light mask 16, to the first mirror 18 and onto the second mirror 20. At the second mirror 20, the optical light path is bent and sent through the cylinder lens 22. From the lens 22, the light path forms an acute illumination angle $\phi_1$ that is then projected onto the illuminated surface 30 creating the illuminated image line 32 shown in FIG. 2 and in a planar end view in FIG. 4.

The maximum image illumination is provided by the acute angle of reflection $\phi_2$, which is equal to angle $\phi_1$. Therefore, the movable optical assembly 23, as shown in phantom in FIG. 4, is placed, as described infra, to location B to optimally receive the reflected image. The choice of the angle $\phi_2$ provides a coding parameter, since any change in this angle changes the resulting projected image applied to the detector/recording surface 34. For this reason, the mirror 20 incorporates a mirror pivot 21 which allows the angle $\phi_1$ to be shifted as desired, which of course, then affects the reflected angle $\phi_2$. In practice, the angle of the mirror 20 is precision set and recorded. This setting can be made by various methods such as by a set of precision angular wedge block standards or a precision pivot that incorporates a vernier control.

Attached to the back of the lens support tube 28 as shown in FIG. 4, is the cylinder spread lens assembly 26 which includes a housing 26a that houses the cylinder spread lens 26b. As shown in FIG. 4, the lens 26b is mounted on a pivot 26c that allows the lens to be pivoted out of the optical path as shown at position B. When in position B, the assembly 23 functions as an objective lens to allow the image that is to be recorded to be initially viewed and set.

As also shown in FIG. 4, in the normal-to-the-surface optical path of the movable optical assembly 23 has a microscope objective lens 36 that moves about a pivot 36a. The lens 36 functions in combination with the spherical achromatic lens 24 to control and provide a precise distance to the surface of the artwork under observation. Initially, the lens 36 is physically pivoted into position $b_1$ away from the final focal path as shown at A. In the $b_1$ position, the movable optical assembly 23 can coarsely locate the section of the artwork that is to be recorded. After the section is so located, the lens 36 is pivoted into the focal path as shown in position $b_2$, where a more precise setting and measurement is made prior to recording with a precision positioning mechanism. The final element comprising the movable optical assembly 23 is the image recording device 60 that is attached to the back of the cylinder spread lens assembly housing 26a as shown in FIG. 4. The image recording device 60 records the image viewed on the detector/recording surface 34 and may consist of a conventional camera, a video camera or any number of electronic digitized recording devices.

Figure 5:
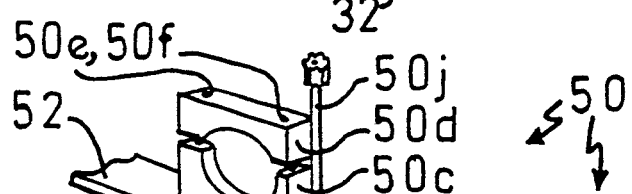
FIG. 5 is a top perspective view of the lens support assembly.
Figure 6:
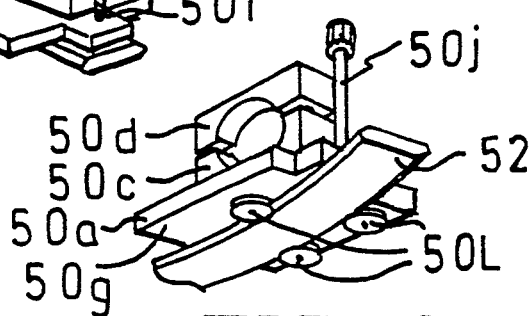
FIG. 6 is a bottom perspective view of the lens support assembly showing a set of rollers attached to a vee-track.

The movable optical assembly 23 is attached, via the lens support tube 28, to a lens support assembly 50 that allows the combination to be moved from position A to position B or any other position therebetween. This assembly, as shown in FIGS. 5 and 6, consists of a base 50a that has attached to its upper surface 50b a lower tube clamp 50c that attaches to an upper tube clamp 50d. The two clamps in combination provide a clamping support structure that firmly holds the lens support tube 28. The two support halves are rigidly clamped by means of set screws 50e that are threaded into a complimentary set of thread bores 50f. On the lower surface 50g are located a plurality of vee-track wheels 50h as best shown in FIG. 6. Preferably three wheels are used and are spaced to allow the assembly 50 to be easily moved and positioned along a vee-track 52. To allow the combination of the cylinder spread lens assembly 26 and the lens support tube 28 to be firmly held at the selected position on the vee-track 52, a threaded bore 50i is located therethrough on one side of the base 50a. Into this bore is threadably inserted a brake shaft 50j that rotates to press the end of the shaft against the base 50a to thus hold the lens support assembly in place.

The operation of the optical system for surface verification is next described.

The purpose of location A, as shown in FIG. 4, is that it is desired to record both the major area whose surface texture is to be recorded, and at least two specific points of reference on the artwork of which one becomes positions x-y zero in the plane of the artwork and the other becomes a control for angle $\alpha$ as seen in FIG. 7.

This is the reason that the cylinder spread lens 26b is withdrawn via the cylinder spread lens pivot 26c. Images are formed by the spherical achromatic lens 24 which is supported within the lens support tube 28 and focused by a focus slide guide 38 which also allows a focal position to be maintained by use of a focus lock screw 38a as shown in FIG. 4. To utilize location A, the narrow illumination line of light 32 may be insufficient to provide the required lighting. Therefore, the stationary optical system 13 may include a flood lamp 64 located within a flood lamp shield 66 and placed within the system housing 62 as shown in FIG. 4. The flood lamp 64 is not used when the filament type lamp 14 is operational, and vice versa.

FIG. 7 is a schematic of a typical x-y type precision positioning system that allows repetitive, accurate relocations of areas of measurement. Only the essential position relationships need be considered: with reference to the reference plane 70, the x-y precision positioning mechanism may be tilted to angle $\alpha$ via angle pivot p.

This provides parallel alignment to the tested surface 72 if desired, or an angle which provides another coding parameter to said cryptographing the recorded data. Angle $\beta$ is merely an indication that the x and y axes remain orthogonal to each other.

The distance between the system housing 62 and tested surface 72 is critical both to the illumination-centered view and also to focus. Therefore, the small circle within the larger one shown at z, in FIG. 7, indicates a small orthogonal movement to z. This would be the viewing and recording position of the tested surface 72.

While normal unprotected textures, such as great works of art, are ideal for measurement, it is also desirable to measure protected textured surfaces as shown in FIGS. 8, 9 and 10 that are coated with a clear material to create a smooth outer surface. Protected surfaces are conventionally composed of two fused common or uncommon transparent materials 76 having a textured cast or stamped thin, opaque layer 78 placed at a tilt angle $\Delta$ in between the two fused materials. This allows the optical system plane for surface verification to be optically orientated to the opaque layer 78 as indicated by right angle $\beta$ in FIG. 10. This figure depicts the optical sandwich in a section that is rotated 90 degrees from those shown in FIGS. 8 and 9. The angle $\Delta$ deflects the system's own light source beam R at an angle from the upper surface 79 in plane P so the illumination that passes into the clear material illuminates only the opaque layer and is the only illumination returned in plane P for viewing.

Therefore, the textured surface provides a unique surface for optical measurement which may not be be otherwise accessed. By fusing all three parts of the optical sandwich it cannot be separated for duplication. The clear, smooth, transparent upper coating does allow the tilted system in FIG. 10 to read uniquely down into its tilted, opaque, textured surfaces. This creates a valuable coded tag for security applications by insertion or attachment to cards, documents or poker chips.

Figure 11:
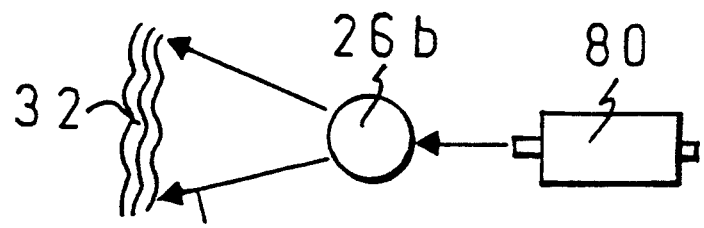
FIG. 11 is a plan view of a laser/cylinder lens illumination system shown with the illuminated surface.
Figure 12:
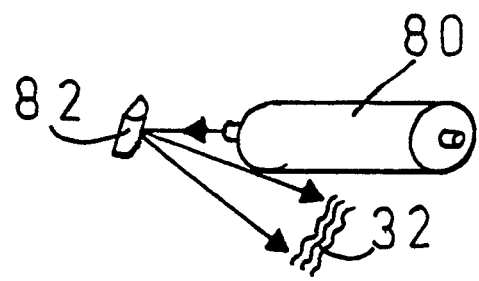
FIG. 12 is a perspective view of a laser/cylinder mirror illumination system shown with the illuminated surface.
Figure 13:
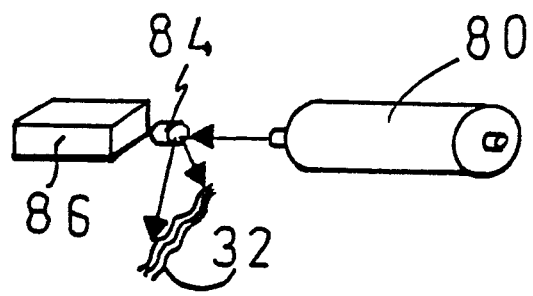
FIG. 13 is a perspective view of a laser/rotating mirror illumination system shown with the illuminated surface.

An alternate system lighting source employing a laser 80 or a plurality of lasers 80 is also disclosed in FIGS. 11, 12 and 13. The laser 80 illumination may be linearly distributed in various ways such as by: merging the outputs together by coincident optics or a coincident scanning means, the laser beam may be spread by a cylinder spread lens 26b as shown in FIG. 11 or spread by reflection from a cylindrical mirror 82 as shown in FIG. 12, or scanned radially by a rotating mirror 84 that is rotated by a motor 86 as shown in FIG. 13.

In summary, the optical system for surface verification 10 consists of a linear illumination source that is projecting light at an acute incident angle $\phi_1$ angle upon a textured surface. The illumination source 12 may consist of either the linear filament type lamp 14 that is projected at the acute angle $\phi_1$ upon a textured surface or a laser 80 that is linearly scanned at an acute angle upon the textured surface. In either case, the optical system includes a cylindrical lens 22 and a spherical achromatic lens 24 that in combination provide the viewing means for viewing the illuminated surface 30 at an acute angle of reflection $\phi_2$ as measured from the normal to the viewing surface. The combination lenses create and project an integrated image characterized by linear magnification in one axis exceeding the other where:

a) the greater magnification is orthogonal to the line of illumination on the textured surface, b) the stationary optical assembly 13 maintains and projects the linear illumination source upon the textured surface so that the long axis of the lens and parallel linear illumination source are also parallel to the textured surface, or a means to scan a laser beam so as to create a line of illumination that is parallel with the long axis of the cylinder optics on the viewing system, and c) a flat planar image recording device that receives the integrated image characterized by unequal magnification.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the claims.

We claim:

1. An optical system for surface verification comprising:
   a) a linear light beam produced by a filiment type lamp having a linear filiment, where the linear light beam is projected at an acute incident angle $\phi_1$, upon a textured surface of an artwork, where the angle $\phi_1$ is measured with respect to a normal from the surface,
   b) means for viewing the illuminated textured surface at an acute angle of reflection $\phi_2$ that is projected from the illuminated textured surface, where the angle $\phi_2$, is measured with respect to a normal from the surface,
   c) means for recording the viewed textured surface.

2. An optical system for surface verification comprising:
   a) a linear light beam produced by a filiment type lamp having a linear filiment, where the linear light beam is projected at an acute incident angle $\phi_1$, upon a textured surface of an artwork, where the angle $\phi_1$ is measured with respect to a normal from the surface and, is projected through a stationary optical assembly comprising:
      (1) a light mask having an image opening and located adjacent to said incandescent lamp,
      (2) a first mirror that receives the light of the image from said light mask,
      (3) a second mirror that receives the reflected image from said first mirror at which point, the optical light path is bent, and where said second mirror further comprises a mirror pivot which allows the acute incident angle $\phi_1$ to be set at selectable positions, and
      (4) a cylinder lens that receives the optical light from said second mirror at which point the optical light path forms an acute incident angle $\phi_1$, that is projected on to an illuminated surface where an illuminated image line is created,
   b) means for viewing the illuminated textured surface at an acute angle of reflection $\phi_2$ that is projected from the illuminated textured surface, where the angle $\phi_2$, is measured with respect to a normal from the surface,
   c) means for recording the viewed textured surface.

3. An optical system for surface verification comprising:
   a) a linear light beam produced by a filiment type lamp having a linear filiment, where the linear light beam is projected at an acute incident angle $\phi_1$, upon a textured surface of an artwork, where the angle $\phi_1$ is measured with respect to a normal from the surface and, is projected through a stationary optical assembly comprising:
      (1) a light mask having an image opening and located adjacent to said incandescent lamp,
      (2) a first mirror that receives the light of the image from said light mask,
      (3) a second mirror that receives the reflected image from said first mirror at which point, the optical light path is bent, and where said second mirror further comprises a mirror pivot which allows the acute incident angle $\phi_1$ to be set at selectable positions,
      (4) a cylinder lens that receives the optical light from said second mirror at which point the optical light path forms an acute incident angle $\phi_1$, that is projected on to an illuminated surface where an illuminated image line is created, and
      (5) a flood lamp that is used to project additional light onto the textured surface,
   b) means for viewing the illuminated textured surface at an acute angle of reflection $\phi_2$ that is projected from the illuminated textured surface, where the angle $\phi_2$, is measured with respect to a normal from the surface,
   c) means for recording the viewed textured surface.

4. An optical system for surface verification comprising:
   a) a linear light beam produced by a filiment type lamp having a linear filiment, where the linear light beam is projected at an acute incident angle $\phi_1$, upon a textured surface of an artwork, where the angle $\phi_1$ is measured with respect to a normal from the surface and, is projected through a stationary optical assembly comprising:
      (1) a light mask having an image opening and located adjacent to said incandescent lamp,
      (2) a first mirror that receives the light of the image from said light mask,
      (3) a second mirror that receives the reflected image from said first mirror at which point, the optical light path is bent, and where said second mirror further comprises a mirror pivot which allows the acute incident angle $\phi_1$ to be set at selectable positions, and (4) a cylinder lens that receives the optical light from said second mirror at which point the optical light path forms an acute incident angle $\phi_1$, that is projected on to an illuminated surface where an illuminated image line is created, b) a movable optical assembly that allows the viewing of the illuminated textured surface at an acute angle of reflection $\phi_2$ that is projected from the illuminated textured surface, where the angle $\phi_2$, is measured with respect to a normal from the surface, said assembly, comprising:

(1) lens support tube having therein a spherical achromatic lens that is focused by a focus slide guide that further includes a focus lock screw that allows the set focal position to be maintained, (2) a cylinder spread lens assembly that is attached, via a housing, to the back of said lens support tube, where within said housing is located a cylinder spread lens that is mounted on a pivot, where said pivot allows said spread lens to be pivoted out of the optical path to allow an image that is to be recorded to be initially set or conversely, is pivoted into the optical path when the set image is ready to be recorded, and, c) means for positioning said movable optical assembly from a location A to a location B.

5. The system as specified in claim 4 wherein said means for positioning said second optical assembly is provided by a combination lens support assembly and vee track, where said lens support assembly comprises a base that has attached to its upper surface a lower tube clamp that attaches to an upper tube clamp by an attaching means, where the two clamps provide a clamping structure that firmly holds the lens support tube, and where on the lower surface of the base is located a plurality of vee-track wheels that are spaced to allow said lens support assembly to be moved and positioned along said vee-track in either position A or position B or any other position therebetween and where said lens support assembly incorporates accurate indexing means that allows all chosen locations to be recorded and subsequently accurately relocated during retest, and a brake shaft that allows said lens support assembly to be held in place along said vee track.

6. An opticalsystem for surface verification comprising:

a) a linear light beam produced by a filiment type lamp having a linear filiment, where the linear light beam is projected at an acute incident angle $\phi_1$, upon a textured surface of an artwork, where the angle $\phi_1$ is measured with respect to a normal from the surface and, is projected through a stationary optical assembly comprising:

(1) a light mask having an image opening and located adjacent to said incandescent lamp, (2) a first mirror that receives the light of the image from said light mask, (3) a second mirror that receives the reflected image from said first mirror at which point, the optical light path is bent, and where said second mirror further comprises a mirror pivot which allows the acute incident angle $\phi_1$, to be set at selectable positions, (4) a cylinder lens that receives the optical light from said second mirror at which point the optical light path forms an acute incident angle $\phi_1$, that is projected onto an illuminated surface where an illuminated image line is created, (5) a microscope objective lens that moves about a pivot and that functions in combination with said spherical achromatic lens only to control and provide a precise distance to the textured surface of the artwork under observation, where when said microscope objective lens is pivoted away from the focal path so that said movable optical assembly can locate the section of the artwork that is to be coarsely recorded or conversely, when it is pivoted into the focal path a more precise setting or measurement is made prior to recording, b) means for viewing the illuminated textured surface at an acute angle of reflection $\phi_2$ that is projected from the illuminated textured surface, where the angle $\phi_2$, is measured with respect to a normal from the surface, and c) means for recording the viewed textured surface.

7. An optical system for surface verification comprising a linear illumination source projected at an acute angle upon a textured surface, where said optical system includes a means for viewing the illuminated, textured surface at an angle of equal reflection to the angle of illumination and where the viewing optics include a cylindrical lens and a spherical achromatic lens combination which creates and projects an integrated image characterized by linear magnification in one axis exceeding the other where:

a) the greater magnification is orthogonal to the line of illumination on the textured surface, b) a movable optical assembly maintains and projects the linear illumination source upon the textured surface so that the long axis of said lens and parallel linear illumination source are also parallel to the textured surface, and c) a flat planar image recording device receives the integrated image characterized by unequal magnification.

8. An optical system for surface verification comprising a linear illumination source consisting of a white light incandescent lamp that projects a light at an acute angle upon a textured surface, where said optical system includes a means for viewing the illuminated, textured surface at an angle of equal reflection to the angle of illumination and where the viewing optics include a cylindrical lens and a spherical achromatic lens combination which creates and projects an integrated image characterized by linear magnification in one axis exceeding the other where:

a) the greater magnification is orthogonal to the line of illumination on the textured surface and the projected illuminating light beam is parallel to the long axis of the cylindrical lens where axis is also parallel to the textured surface, b) a movable optical assembly maintains and projects the linear illumination source upon the textured surface so that the long axis of said lens and parallel linear illumination source are also parallel to the textured surface, and c) a flat planar image recording device receives the integrated image characterized by unequal magnification.

9. An optical system for surface verification comprising a linear illumination source projected at an acute angle upon a textured surface that is protectively coated with a clear material to create a smooth outer surface, where said optical system includes a means for viewing the illuminated, textured surface at an angle of equal reflection to the angle of illumination and where the viewing optics include a cylindrical lens and a spherical achromatic lens combination which creates and projects an integrated image characterized by linear magnification in one axis exceeding the other where:
   a) the greater magnification is orthogonal to the line of illumination on the textured surface,
   b) a movable optical assembly maintains and projects the linear illumination source upon the textured surface so that the long axis of said lens and parallel linear illumination source are also parallel to the textured surface, and
   c) a flat planar image recording device receives the integrated image characterized by unequal magnification.

10. An optical system for surface verification comprising a laser illumination source scanned at an acute angle upon a textured surface where said optical system includes a means for viewing the illuminated, textured surface at an angle of reflection equal to the angle of incident illumination and where the viewing optics include a cylindrical lens and a spherical lens combination which creates and projects an integrated image characterized by linear magnification in one axis exceeding the other where:
   a) the greater magnification is orthogonal to the line of illumination of the textured surface, and
   b) a planar image recording device receives an integrated image characterized by unequal magnification.

11. An optical system for surface verification comprising a laser illumination source consisting of a plurality of lasers where their respective outputs are merged together by coincident optics, where said illumination source is scanned at an acute angle upon a textured surface where said optical system includes a means for viewing the illuminated, textured surface at an angle of reflection equal to the angle of incident illumination and where the viewing optics include a cylindrical lens and a spherical lens combination which creates and projects an integrated image characterized by linear magnification in one axis exceeding the other where:
   a) the greater magnification is orthogonal to the line of illumination of the textured surface, and
   b) a planar image recording device receives an integrated image characterized by unequal magnification.

12. An optical system for surface verification comprising a laser illumination source that produces a laser beam that is linearly spread by the refraction of a cylinder spread lens and that is scanned at an acute angle upon a textured surface where said optical system includes a means for viewing the illuminated, textured surface at an angle of reflection equal to the angle of incident illumination and where the viewing optics include a cylindrical lens and a spherical lens combination which creates and projects an integrated image characterized by linear magnification in one axis exceeding the other where:
   a) the greater magnification is orthogonal to the line of illumination of the textured surface, and
   b) a planar image recording device receives an integrated image characterized by unequal magnification.

13. An optical system for surface verification comprising:
   a) a linear light beam produced by a filiment type lamp having a linear filiment, where the linear light beam is projected at an acute incident angle $\phi_1$, upon a textured surface of an artwork, where the angle $\phi_1$ is measured with respect to a normal from the surface,
   b) means for viewing the illuminated textured surface at an acute angle of reflection $\phi_2$ that is projected from the illuminated textured surface, where the angle $\phi_2$ is measured with respect to a normal from the surface,
   c) a two dimensional type precision positioning system that allows repetitive and accurate relocations of the areas of measurement, and that may be tilted in the x-y plane with respect to the tilted surface of the artwork,
   d) a precision positioning mechanism that permits accurate optical focusing, and
   e) means for recording the viewed textured surface.

14. The system as specified in claim 4 wherein said means for recording the viewed textured surface of the artwork is an image recording device attached to the back of said cylinder spread lens assembly housing, where said device records the image viewed on a detector/recording surface also located within said image recording device.

* * * * *